United States Patent [19]

Lee et al.

[11] Patent Number: 4,700,617
[45] Date of Patent: Oct. 20, 1987

[54] AUTOMATIC FRYING MACHINE

[76] Inventors: Yu-Chuan Lee, 8280 Carburton St., Long Beach, Calif. 90808; Wu-Long Lee, 2255 Moon View Dr., Hacienda Heights, Calif. 91745

[21] Appl. No.: 842,820

[22] Filed: Mar. 24, 1986

[51] Int. Cl.[4] ............................................. A47J 27/00
[52] U.S. Cl. .................................. 99/327; 134/115 R; 99/332; 99/335; 99/342; 99/348; 99/352; 99/357
[58] Field of Search ................. 99/326, 348, 352, 423, 99/443 R, 334, 335, 336, 357, 325, 327, 332, 342; 134/76, 115 R, 150; 426/523

[56] References Cited

U.S. PATENT DOCUMENTS 3,670,746  6/1972  Gehrmann ..................... 99/357 X
3,827,344  8/1974  Pratolongo ..................... 99/352
4,503,502  3/1985  Chapin ......................... 99/348 X

FOREIGN PATENT DOCUMENTS 2503556 10/1982 France ........................... 99/352

Primary Examiner—Timothy F. Simone
Attorney, Agent, or Firm—Asian Pacific International Patent & Trademark Office

[57] ABSTRACT

The specification relates to an automatic frying machine, including a feeder device to place materials automatically into a pan, a frying and stirring device and a mechanism to turn the pan through 180° for the purpose of serving the prepared food. The machine does pan washing with a stirrer and water injectors which automatically inject water. The device can be operated in a single process with the operations including material feeding, frying, serving and pan washing.

8 Claims, 6 Drawing Figures

AUTOMATIC FRYING MACHINE

BACKGROUND OF THE INVENTION

The present invention provides equipment to modernize the kitchen operation of a Chinese restaurant with high quality and productive means to reduce or eliminate operator error so that fast-food operations comparable to McDonald's of the western society can be established. The equipment can provide prepared food of consistent quality and can supply food from a central kitchen according to a standard recipe and cooking process. The equipment can be used in a chain store and requires only that semi-finished food, which may be divided into three lots, and held in three respective containers be supplied to the feeding system of the machine. The machine can complete frying from, material feeding, serving and pan washing in a single process without a cook. It allows generally automated Chinese Fast Food operations for chain stores and the like operations.

SUMMARY OF THE INVENTION

The invention provides a process including material feeding, frying, serving, pan washing, with a pneumatic control system and electronic control devices to produce quality Chinese food generally without help of a skilled cook.

The present invention is further characterized by the present timing in material feeding, frying, serving and pan washing and a buzzer which will indicate at the end of the preset time completion of the frying step.

The present invention is further characterized by a compressed air operated stirrer which can operate in the frying pan for mixing purpose.

The present invention is further characterized by a pneumatic transmission system including micro switches so that the pan can be turned by 90° in order to transfer material to a dish or plate, as well as to a washing position for washing with water injected from water injector, and rotation of the stirrer for a preset time.

DETAILED DESCRIPTION

Figure 1:
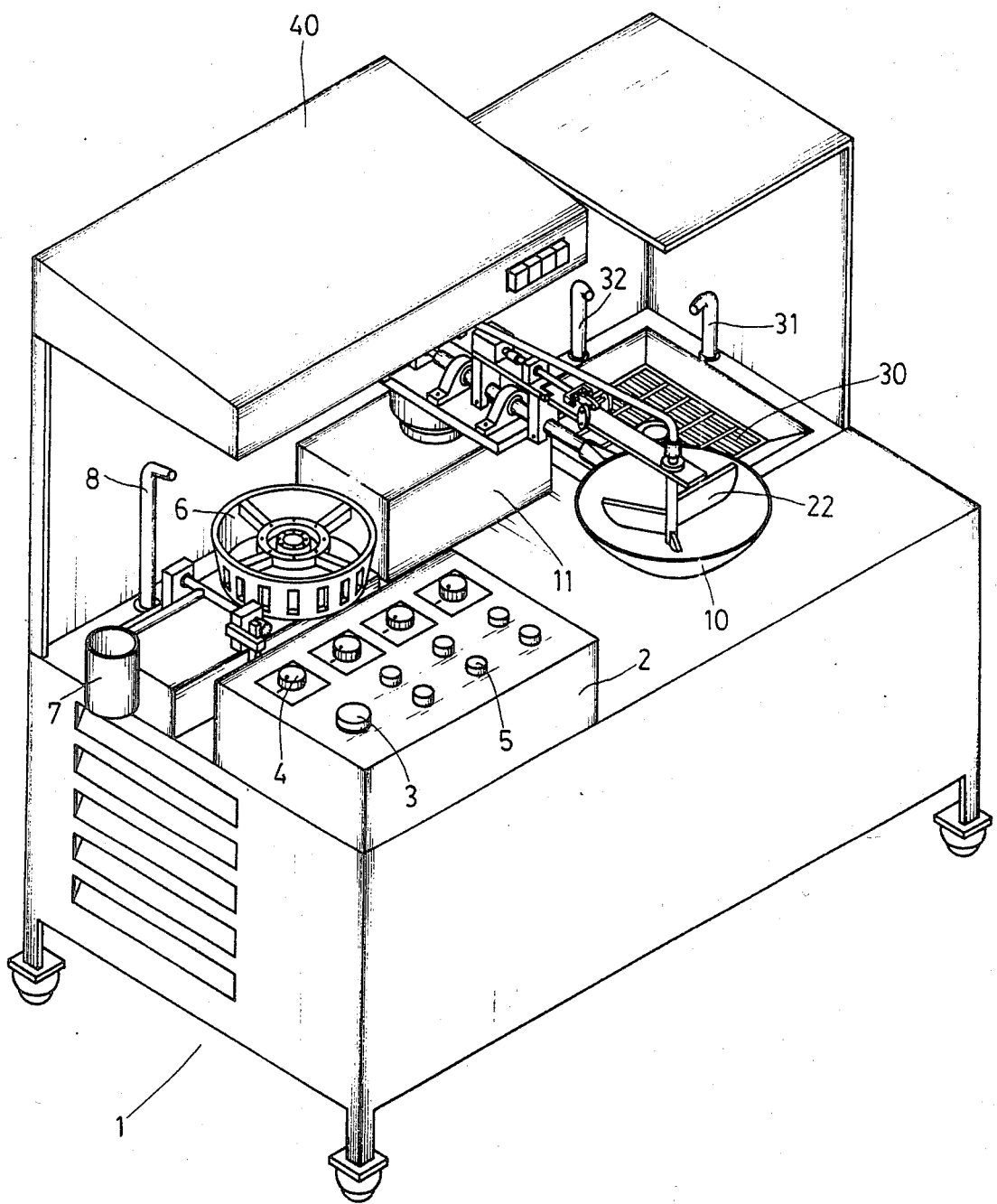
FIG. 1 is a perspective view of one embodiment of the present invention.
Figure 2:
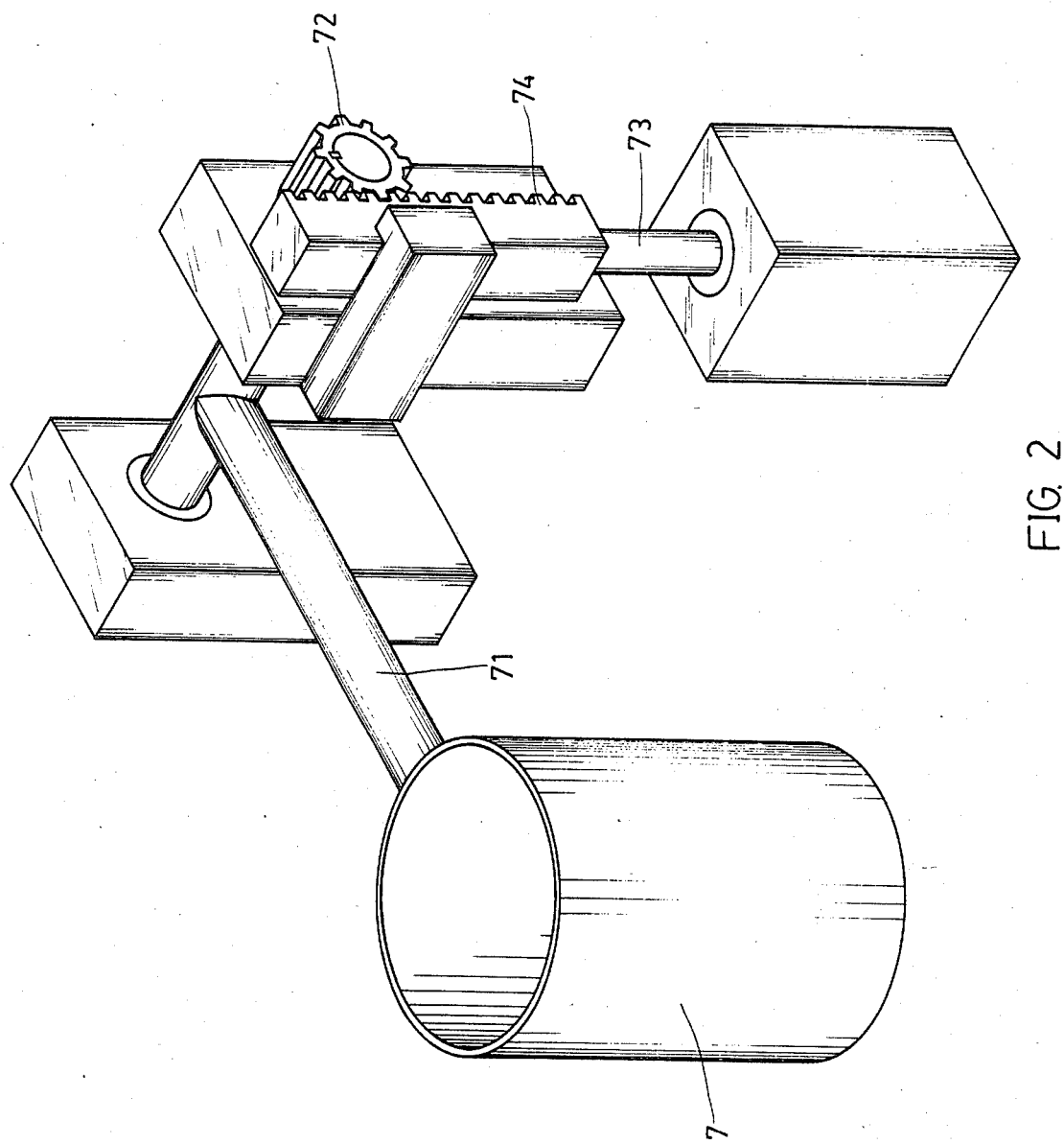
FIG. 2 illustrates a feeder mechanism according to the present invention.
Figure 3:
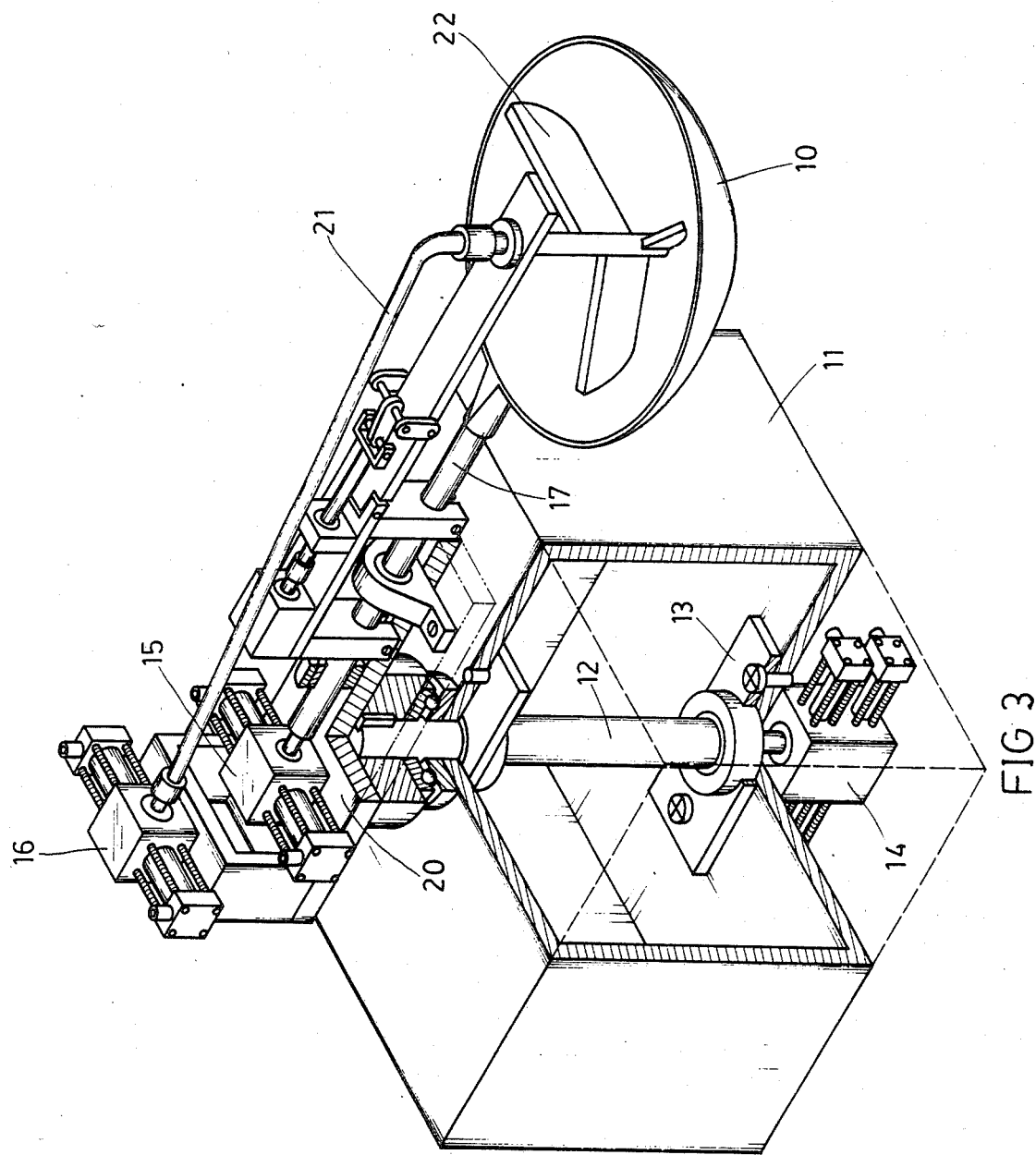
FIG. 3 illustrates a stirrer according to the present invention.
Figure 5:
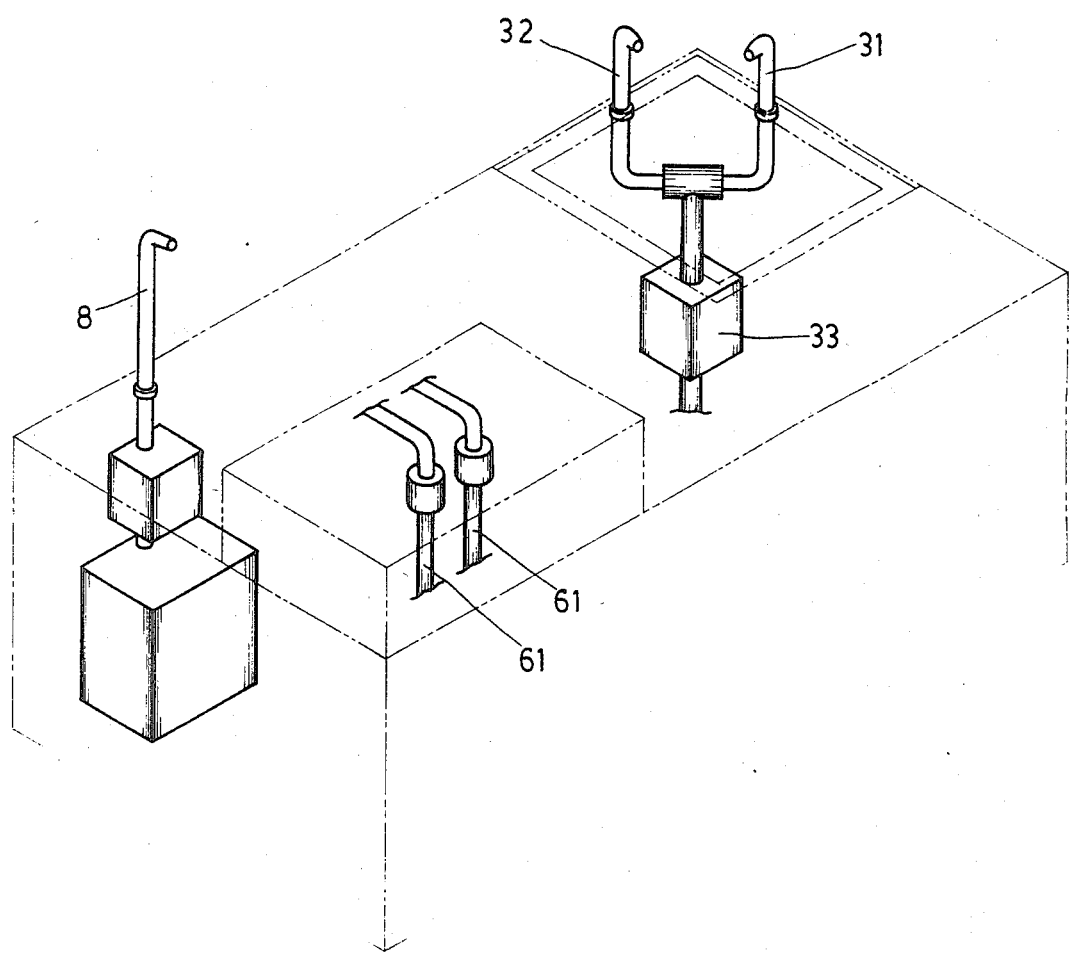
FIG. 5 is a partial perspective view of equipment to supply gas, cooking oil and water in the embodiment of FIG. 1 of the present invention.

With reference to FIG. 1, a perspective view of one embodiment of the present invention, a control panel 2 is placed on the forward side of a body 1. On the control panel 2 are a main switch 3, several timers 4 and several sequence switches 5. A gas burner or stove 6 is positioned next to the control panel 2. Gas pipes 61 are connected to the bottom of the gas burner 6 as is shown in FIG. 5. Beside the gas stove 6 there is a material tank 7 in the form of a drum for storage of prepared materials. The mechanism for actuating the material tank 7 is shown in FIG. 2. It includes a link 71 or lever connected to the material tank 7. One end of the link 71 has a gear 72 which is meshing with a rack 74 at the upper end of a moving rod 73 so that upward movement of the moving rod 73 will drive the material tank 7 to turn or rotate through 180° due to the meshing interaction between the rack 74 and the gear 72 at the link 71, and, consequently, materials in the material tank 7 are delivered into a pan 10 on the gas burner 6. An oil injector 8 is placed between the gas burner 6 to directly inject oil into the pan 10. Beside the gas burner 6 there is a base 11 on which a mixing mechanism is installed. As shown in FIG. 3, the mechanism includes a vertical shaft 12 which is arranged in the base 11 so as to rotate in normal (forward) and reverse directions. Beneath the shaft 12 there is a shaft block 13 and an air cylinder 14 for controlling 90°/0/90° rotation of the shaft 12. Above the base 11 there is a shaft block 20 on which an air cylinder 15 and another air cylinder 16 are installed. The air cylinder 15 is connected at one end of a long rod 17 of which the other end is connected to the pan 10. The air cylinder 16 is connected to a rotatable flexible shaft 21 the forward end of which is connected to a stirrer 22 which has a plurality of blades to mix or stir material in the pan 10 for quick frying.

A sink 30 is placed beside the mixing mechanism. Water injectors 31 and 32 are located along the sink 30 which has a sequence control valve 33 on the bottom as shown in FIG. 5 to directly inject water into the pan for washing with stirring of the stirrer 22. A smoke exhaust hood and fan 40 are installed above the gas burner 6 in order to maintain clean indoor air.

Figure 4:
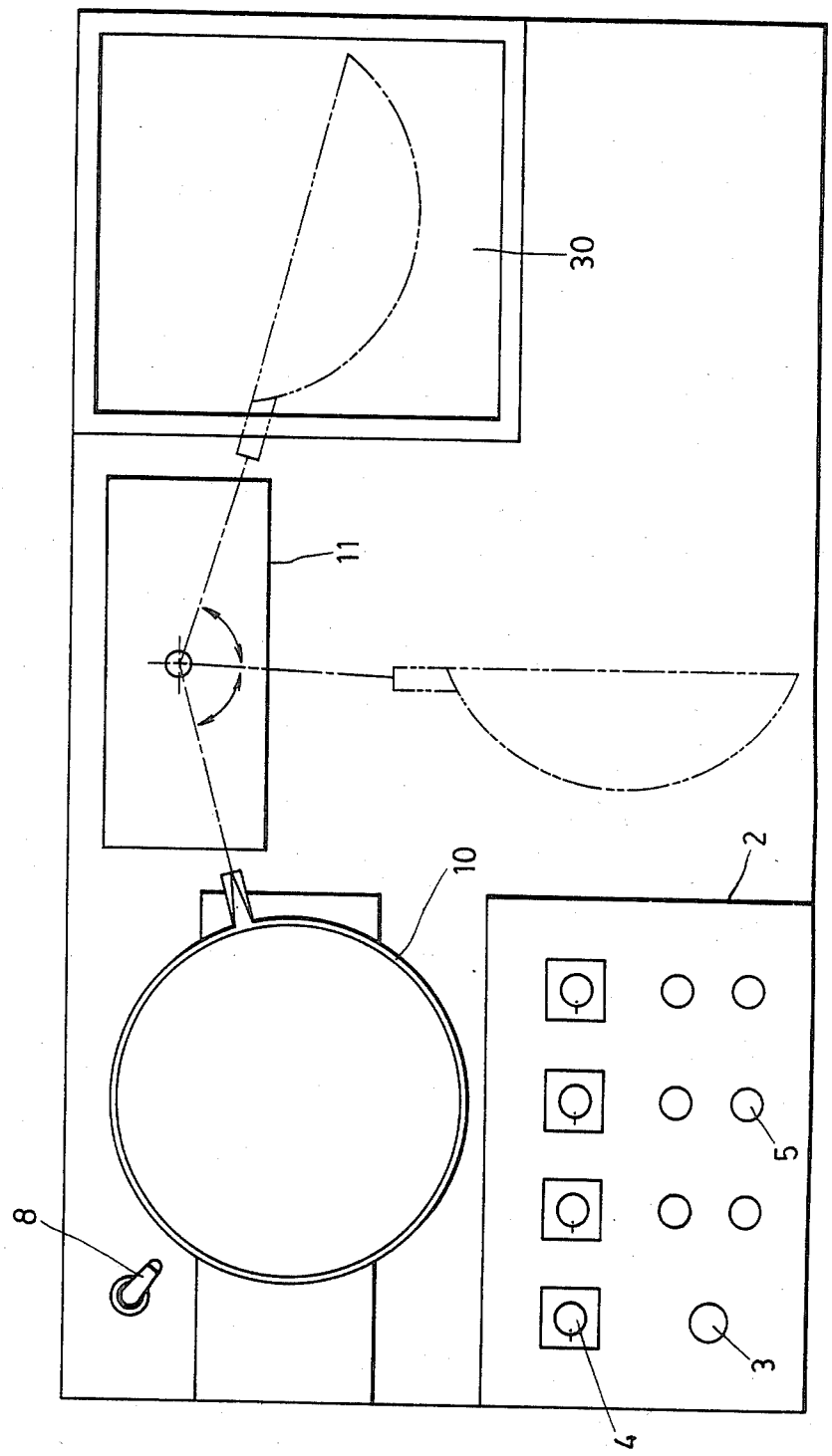
FIG. 4 illustrates displacement of the pan.

FIG. 4 illustrates that the pan 10 can be moved to assume several different positions. For the frying process, the pan 10 is controlled by the air cylinder 14, via rotation of the shaft 12, in order to move to the position above the gas burner 6 for frying. The air cylinder 14 controls the shaft 12 to rotate and turn the pan through 90° at the end of frying cycle, and then the air cylinder 15 turns the pan 10 with respect to the horizontal, and the fried material is delivered into a dish (not shown) therebeneath. Sequentially, the air cylinder 14 turns the shaft 12 again and, accordingly, the pan 10 to a position above the sink 30 for cleaning with water injected from the water injector 31.

Figure 6:
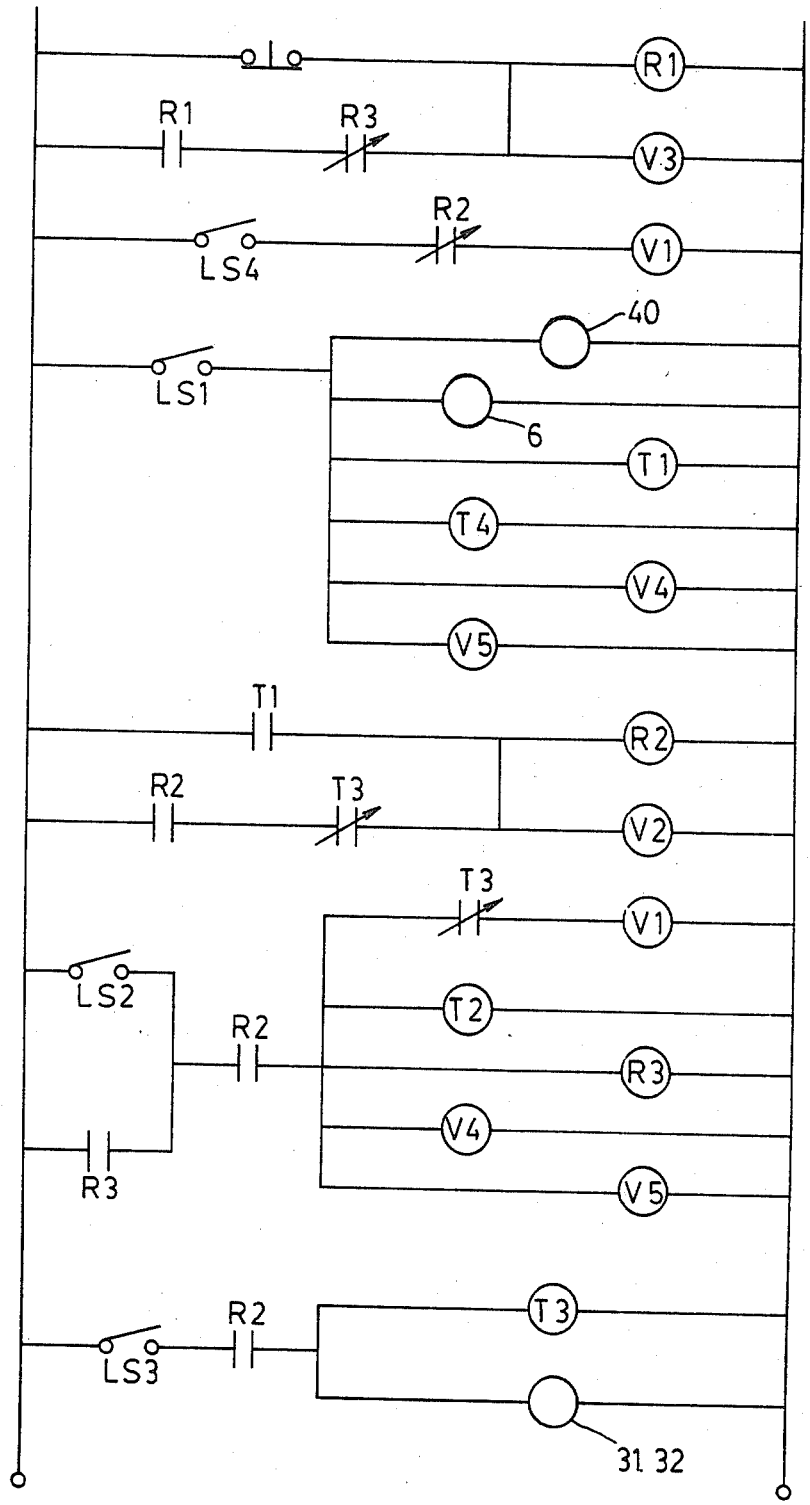
FIG. 6 is a sequence control circuit diagram according to the present invention.

FIG. 6 is a sequence control or circuit diagram for the present invention. A description for operating sequence and action of the present invention is given below with reference to FIG. 1. Turning on the main switch 3 will put R1 in a close circuit. Then, the pan 10 is moved from the washing position to the frying position. That is, V1 functions, the air cylinder 14 turns the shaft 12 to move the pan 10 to the frying position where a micro-switch LS1 is contacted there by to ignite the gas burner 6 and to turn on the smoke exhaust fan 40. Sequentially, the timer T1 starts timing, the oil injector 8 injects oil into the pan 10, the stirrer 22 which is controlled by the air cylinder 16 is lowered and starts stirring, the material tank 7 feeds material (including vegetable, meat and condiment into the pan 10. V4 operates for frying. The timer T1 is set for a valve between 30 seconds and 8 minutes. At the end of the preset time period, a buzzer will sound to indicate completion of frying. V5 operates to raise the stirrer 22, the air cylinder 14 turns the shaft 12 through 90° to the delivery or unloading position, T2 and starts timing of unloading. LS1 is reset to close the gas valve, the micro-switch LS2 is contacted to operate V3 so that the pan 10 is turned over, and the stirrer 22 rotates to facilitate that materials drop into a dish. At the end of the time period preset at T2, the stirrer 22 stops rotation, the microswitch LS4 is contacted to turn the pan 10 to its original position, and the air cylinder 10 turns the shaft 12 to move the pan 10 to the washing position. LS2 resets to turn off the smoke exhaust fan 40, the micro switch LS3 starts operation, the water injector 31 injects water automatically, and the stirrer 22 rotates to help washing. Next, the timer T3 starts timing, and, at end of the respective preset time period, the water injector 31 stops water injection, the stirrer 22 stops and lifts, the power source is turnd off automatically, and the entire cooking process ends.

Materials to be cooked may be divided into three lots, the first is comprised of vegetables, the second prepared meat, and the third condiment, which are respectively placed in the material tank 7 for falling delivery into the pan 10. The machine need to be operated by only one person, and a single person may operated several machines simultaneously without any cook. With such machine delicate Chinese food can be cooked.

We claim:

1. An automatic food preparation apparatus, especially for preparing Chinese dishes, characterized by being capable of operating a substantially continuous processing sequence including the unit operations of material feeding, frying and similarly heating received material, serving prepared food onto dishes and washing the respective pan, said apparatus comprising, in combination:
   (a) a base
   (b) individual outlet means for water, heat and motive power, said outlet means mounted in said base, with each outlet being respectively conneted to a source of water, a source of heat and a source of motive power;
   (c) a control cluster supported on said base and which includes at least a main switch, a plurality of timers and a plurality of sequence switches;
   (d) a feeder mechanism arranged on said base and adapted to bring food from a receiving location to the heat outlet means for cooking and frying in such a way that foodstuff is displaced through an arc of 180° and then can fall into a respective pan due to gravity;
   (e) a stirring mechanism arranged on said base, said mechanism including a stirrer comprised of a plurality of blades, a flexible rotatable shaft having a first end and a second end with said stirrer being connected to the first end of said flexible rotatable shaft, and a pneumatic piston and cylinder unit operatively connected to the second of said flexible rotatable shaft for imparting stirring motions to said shaft and said stirrer;
   (f) a first shaft having a first end and a second end, with the respective pan being operatively connectable to the first, forward, end of said first shaft;
   (g) a pneumatic piston and cylinder unit operatively connected to the second of said first shaft for imparting turning motions to the pan thereby to remove prepared food from the pan;
   (h) a shaft block for mounting thereon said pneumatic piston and cylinder unit for said first shaft and for mounting thereon said pneumatic piston and cylinder unit for said second shaft;
   (i) a second shaft rotatable in both normal, forward, and reverse directions, said second shaft having a first end and a second end, with said shaft block being connected to said first end of said second shaft;
   (j) a pneumatic piston and cylinder unit operatively connected to the second end of said second shaft for imparting laterally swinging motions to said second shaft for displacement of said stirring mechanism and the respective pan supported at the forward end of said first shaft from the outlet means of heat to the outlet means for water at a respective sink;
   (k) a sink for washing the pan; and
   (l) water injectors alongside said sink to inject water automatically when washing the pan while stirring motion is imparted to said stirrer.

2. The apparatus of claim 1 and further including as heat outlet a gas stove with a gas burner and said source of heat is a gas tank.

3. The apparatus of claim 1 wherein said feeder mechanism is comprised of:
   a link pivotally mounted at said support, said link having a first end and a second end;
   a material tank connected to said first end;
   a gear secured at second end of said link;
   a reciprocating rod having a first end and a second end;
   a rack secured at said first end of said reciprocating rod for meshingly engaging said gear secured at the second end of said link; and
   piston and cylinder means for actuating said reciprocating rod such that the rack rotates said gear and said link with sufficient force to remove all foodstuff from said material tank into the receiving pan.

4. The apparatus of claim 1 wherein said pneumatic piston and cylinder units are actuated in accordance with signals invoked from said control cluster.

5. The apparatus of claim 4 wherein an audible signal is generated in reference to preset timing for material feeding, frying, serving and pan washing to indicate the completion of the preset time cycle.

6. The apparatus of claim 1 wherein at least one pneumatic piston and cylinder unit is operated with compressed air.

7. The apparatus of claim 6 wherein said pneumatic piston and cylinder unit for said stirrer is operated with compressed air.

8. The apparatus of claim 6 including at least one microswitch for invoking actuation of at least one pneumatic piston and cylinder unit.

* * * * *